H. A. MYERS.
RECORD CONTROLLING MECHANISM.
APPLICATION FILED JULY 30, 1915.

1,224,092.

Patented Apr. 24, 1917.

INVENTOR
Hubert A Myers
BY
Geo E Kirk
ATTORNEY

UNITED STATES PATENT OFFICE.

HUBERT A. MYERS, OF TOLEDO, OHIO.

RECORD-CONTROLLING MECHANISM.

1,224,092.

Specification of Letters Patent.

Patented Apr. 24, 1917.

Application filed July 30, 1915. Serial No. 42,699.

*To all whom it may concern:*

Be it known that I, HUBERT A. MYERS, a citizen of the United States of America, residing at Toledo, Lucas county, Ohio, have invented a new and useful Record-Controlling Mechanism, of which the following is a specification.

This invention relates to features of driving and control of rotatable record members. This invention has utility when incorporated in machines.

Referring to the drawings.

Figure 1:
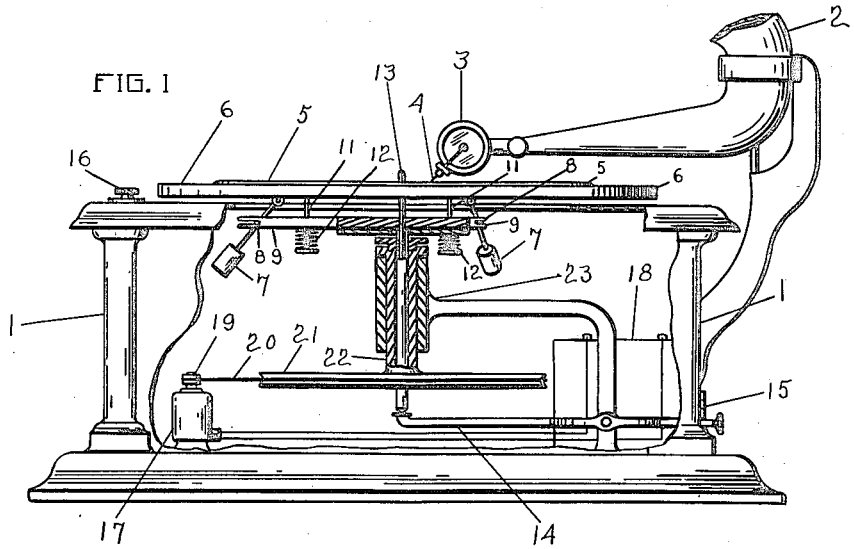
Figure 1 is a side elevation, with parts broken away, showing an embodiment of the invention in a talking machine.
Figure 2:
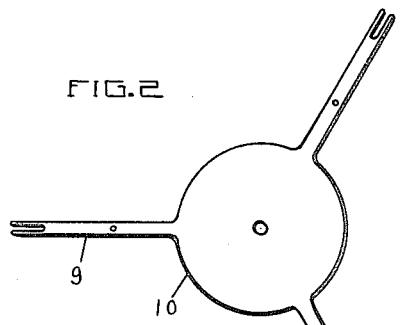
Fig. 2 is a top plan view of the fly weight shifted friction disk.
Figure 3:
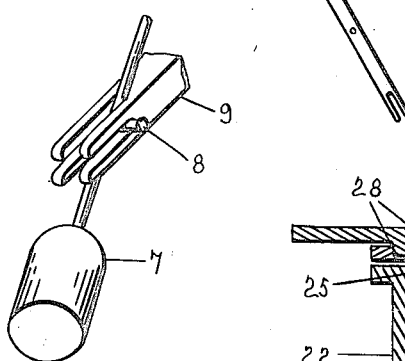
Fig. 3 is a fragmentary detail, in perspective, of the connection of a fly weight to the friction disk arm.
Figure 4:
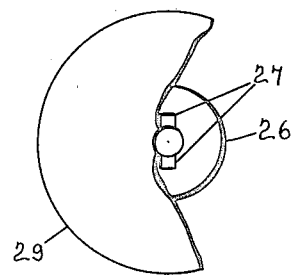
Fig. 4 is a fragmentary plan view of the driving friction disk and its rocking coupling.
Figure 5:
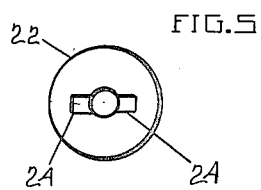
Fig. 5 is a plan view of the rocking coupling connection on the driving sleeve.
Figure 6:
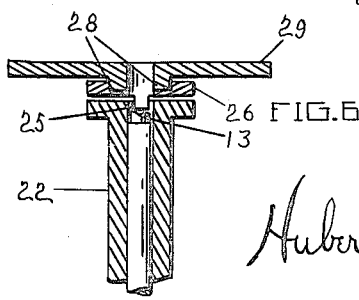
Fig. 6 is a vertical section on an enlarged scale of the driving disk and its mounting at right angles to the showing in Fig. 1.

The talking machine comprises the cabinet or box 1 upon which is mounted the amplifier 2 having the sound box 3 carrying the needle 4 adjacent the disk record 5 for reproduction therefrom or production thereon. The disk 5 is mounted on the record carrier 6 centrally of the cabinet 1. Pivotally mounted on the lower side of the carrier 6 are the fly weights 7 of the speed regulator. These fly weights have connection through the pins 8 with the forked arms 9 of the shiftable clutch or friction disk 10 disposed coaxially with the rotatable carrier 6. To render the action of the fly weights more sensitive, pins 11 from the carrier 6 have springs 12 thereon tending to lift the disk 10, so that when the desired driving speed is exceeded the disconnection is at once effected and complete.

The carrier 6 is mounted on the shaft or support 13 stepped in the lever 14 adjustable to engage different teeth 15 and thereby vary the position of the friction disk 10 and accordingly the speed incident to the clutch control.

The switch 16 may be rotated to close the circuit for starting the electric motor 17 from the source of electric current, as the battery 18. The motor 17 has the pulley 19 actuating the driving belt 20 for the driver 21 fast on the sleeve 22 coaxial with the carrier 6 and centering the carrier supporting shaft 13. This sleeve 22 is mounted in the bearing 23. The upper extremity of the sleeve 22 has recesses 24 diametrically disposed for receiving projections 25 on the coupling 26, while at 90° from these projections 25, but on the opposite side of the coupling 26 are the diametrically disposed recesses 27 for receiving the projections 28 of the lower or driving friction disk 29. These projections and recesses form a rocking connection insuring the lower disk 29 alining up in its clutch coaction with the upper opposing disk 10. The direct drive of the actuating motor 17 is thus automatically modified to insure uniform rotative speed for the carrier 6 at such adjusted rate as may be determined upon by the positioning of the lever 14.

What is claimed and it is desired to secure by Letters Patent is:

1. A rotatable record carrier, a vertical coaxial relatively independently rotatable driver therefor embodying a clutch member, a second clutch member rotatable with the carrier, and fly weights directly mounted on the carrier and having coaction with one of the clutch members to move it out of and into engagement with the other clutch member.

2. A rotatable record carrier, a shaft therefor, fly weights directly mounted upon the carrier within the radial extent thereof independently of the shaft and spaced therefrom, a vertically coaxial friction disk carried by the carrier and provided with extensions engageable by the fly weights whereby the friction disk is shiftable by the fly weights, and an opposing driving friction disk for actuating the fly weight shifted disk.

3. A rotatable record carrier, a shaft therefor, fly weights directly mounted on the under side of the carrier independently of the shaft and spaced therefrom, a driver embodying a clutch member, a second clutch member normally yieldably sustained by the carrier, and fly weights for shifting the yieldably sustained clutch member from and toward the driving clutch member.

4. A rotatable record carrier, a shaft therefor, fly weights directly mounted on the under side of the carrier independently of the shaft and spaced therefrom, a driver embodying a friction member, a second friction member normally yieldably sustained by the carrier, and fly weights for shifting the yieldably sustained friction member from and toward the driving clutch member.

5. A rotatable record carrier, fly weights directly mounted on the under side of the carrier, a driver embodying a friction member, a second friction member normally yieldably sustained by the carrier, fly weights for shifting the yieldably sustained friction member from and toward the driving clutch member, and an adjustable support for the carrier including means for varying the action of the friction member.

6. A rotatable record carrier, a shaft therefor, fly weights directly mounted on the under side of the carrier independently of the shaft and spaced therefrom, a driver embodying a friction member, a second friction member normally yieldably sustained by the carrier, and fly weights for shifting the yieldably sustained friction member from and toward the driving clutch member, there being a self adjusting alining carrying connection for one of said friction members.

In witness whereof I affix my signature.

HUBERT A. MYERS.